US008022357B2

(12) United States Patent
Amir et al.

(10) Patent No.: US 8,022,357 B2
(45) Date of Patent: Sep. 20, 2011

(54) SYSTEMS AND METHODS FOR GENERATING CALIBRATION MAPS FOR NON-PIXELATED GAMMA DETECTORS

(75) Inventors: Ornit Amir, Yokneam (IL); Michael Kogan, Haifa (IL); Leonid Beilin, Haifa (IL); Yaron Hefetz, Kibbutz Alonim (IL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/649,919

(22) Filed: Dec. 30, 2009

(65) Prior Publication Data
US 2011/0155900 A1 Jun. 30, 2011

(51) Int. Cl.
*G12B 13/00* (2006.01)
(52) U.S. Cl. ............. 250/252.1; 250/361 R; 250/363.01
(58) Field of Classification Search .............. 250/252.1, 250/361 R–363.01
See application file for complete search history.

(56) References Cited

U.S. PATENT DOCUMENTS

| 4,588,897 | A | 5/1986 | Inbar et al. |
| 5,491,342 | A | 2/1996 | Lim et al. |
| 6,559,450 | B1 | 5/2003 | Berlad et al. |
| 7,220,961 | B2 | 5/2007 | Chapman |
| 7,381,964 | B1 | 6/2008 | Kump et al. |
| 7,819,581 | B2 | 10/2010 | Srinivasan et al. |
| 7,872,221 | B2 * | 1/2011 | Blevis et al. ............... 250/252.1 |
| 2006/0214097 | A1 * | 9/2006 | Wang et al. ................ 250/252.1 |
| 2007/0023669 | A1 * | 2/2007 | Hefetz et al. ............. 250/370.14 |
| 2007/0252079 | A1 | 11/2007 | Wang et al. |
| 2008/0192899 | A1 | 8/2008 | Kump et al. |
| 2010/0121811 | A1 * | 5/2010 | Ramsden et al. ............... 706/54 |

FOREIGN PATENT DOCUMENTS

| EP | 1 359 439 A2 | 11/2003 |
| WO | WO 98/19179 | 5/1998 |

OTHER PUBLICATIONS

International Search Report dated May 26, 2011, Application No. GB1021629.9, (4) pages.

* cited by examiner

*Primary Examiner* — David P Porta
*Assistant Examiner* — Casey Bryant
(74) *Attorney, Agent, or Firm* — Dean Small; The Small Patent Law Group

(57) ABSTRACT

A method for calibrating a non-pixelated gamma camera is provided, wherein the method includes determining a linearity map and a uniformity map of a reference isotope; and determining a linearity map and uniformity map of another isotope. Delta maps are calculated based on the maps of the reference isotope and the maps of the other isotope. During recalibration, new maps of the reference isotope are determined, thereby enabling new maps of the other isotope to be created based on the delta maps.

16 Claims, 8 Drawing Sheets

SYSTEMS AND METHODS FOR GENERATING CALIBRATION MAPS FOR NON-PIXELATED GAMMA DETECTORS

BACKGROUND OF THE INVENTION

The subject matter disclosed herein relates to gamma cameras, and more particularly to methods for calculating linearity and uniformity maps for non-pixelated gamma cameras.

Non-pixelated gamma cameras typically include a single crystal scintillator formed from Sodium Iodide (NaI). During a gamma event, light emissions from the crystal are detected by an array of photomultiplier tubes (PMTs) to create a signal that is integrated by a computer to determine a location and total energy of the event. However, the signal is typically non-linear due to a curvature response of the PMT array and gaps between the PMTs. As such, the detected location of the event will vary from the actual location of the event, thereby resulting in a poor image created from the signal if not corrected.

To correct the location of the event, calibration maps are applied to the image data. Different types of maps may be used. An energy map translates the energy as measured to the actual energy. A linearity map translates the location as measured to the actual location. A uniformity map corrects imperfections or non-uniformities in the detector by applying a correction factor to smooth or even the image. Typically, these maps are created for each of a plurality of isotopes during initial calibration and stored in a computer for subsequent calibrations of the cameras and are specific to the particular cameras or systems.

However, as the camera ages and is subject to repairs including replacing the PMTs, the maps become less accurate. For example, inaccuracies in the maps may result in straight lines being detected as curved lines or cause deviations in isotope emission peaks. Accordingly, a person in the field must recalibrate the camera for each isotope that is to be detected by the camera. Such recalibration takes a significant amount of time. Moreover, it is often difficult to acquire data for each of the isotopes that may be detected by the camera.

BRIEF DESCRIPTION OF THE INVENTION

In various embodiments, a method for providing a calibration map for a non-pixelated gamma detector is provided, wherein the method includes determining a calibration map for a reference isotope for a non-pixelated gamma detector and creating a calibration map for another isotope by applying to the calibration map of the reference isotope, a delta map corresponding to the other isotope. The delta map is based on a relationship between the reference isotope and the other isotope.

In other various embodiments, a method of creating at least one delta map for a non-pixelated gamma detector is provided, wherein the method includes determining at least one calibration map of a reference isotope and determining at least one calibration map of another isotope. A delta map is then calculated based on a relationship between the calibration map of the reference isotope and the calibration map of the other isotope.

In yet other various embodiments, a calibration module for providing a calibration map for a non-pixelated gamma detector is provided, wherein the calibration module is configured to determine a calibration map for a reference isotope for a non-pixelated gamma detector. A calibration map is then created for another isotope by applying to the calibration map of the reference isotope, a delta map corresponding to the other isotope, wherein the delta map is based on a relationship between the reference isotope and the other isotope.

In other various embodiments, a method of uniformity correction for a nuclear camera having a removable collimator for a plurality of isotopes is provided. The method includes calculating collimator uniformity by measuring reference intrinsic uniformity of a nuclear camera detector at a reference energy using a reference isotope source and with the collimator removed from the detector; measuring reference composite uniformity of a nuclear camera detector at a reference energy using a reference isotope flood source and with the collimator installed on the detector; and calculating collimator uniformity for the collimator by dividing the measured composite uniformity by the measured intrinsic uniformity. The method also includes measuring second intrinsic uniformity of the nuclear camera detector at a second energy using a second isotope source and with the collimator removed from the detector. A second composite uniformity for the collimator for second energy is calculated by multiplying the measured second intrinsic uniformity by the calculated collimator uniformity. Images acquired by the nuclear camera detector at energy range of the second isotope when the collimator is installed are then corrected using the calculated second composite uniformity.

DETAILED DESCRIPTION OF THE INVENTION

Figure 1:
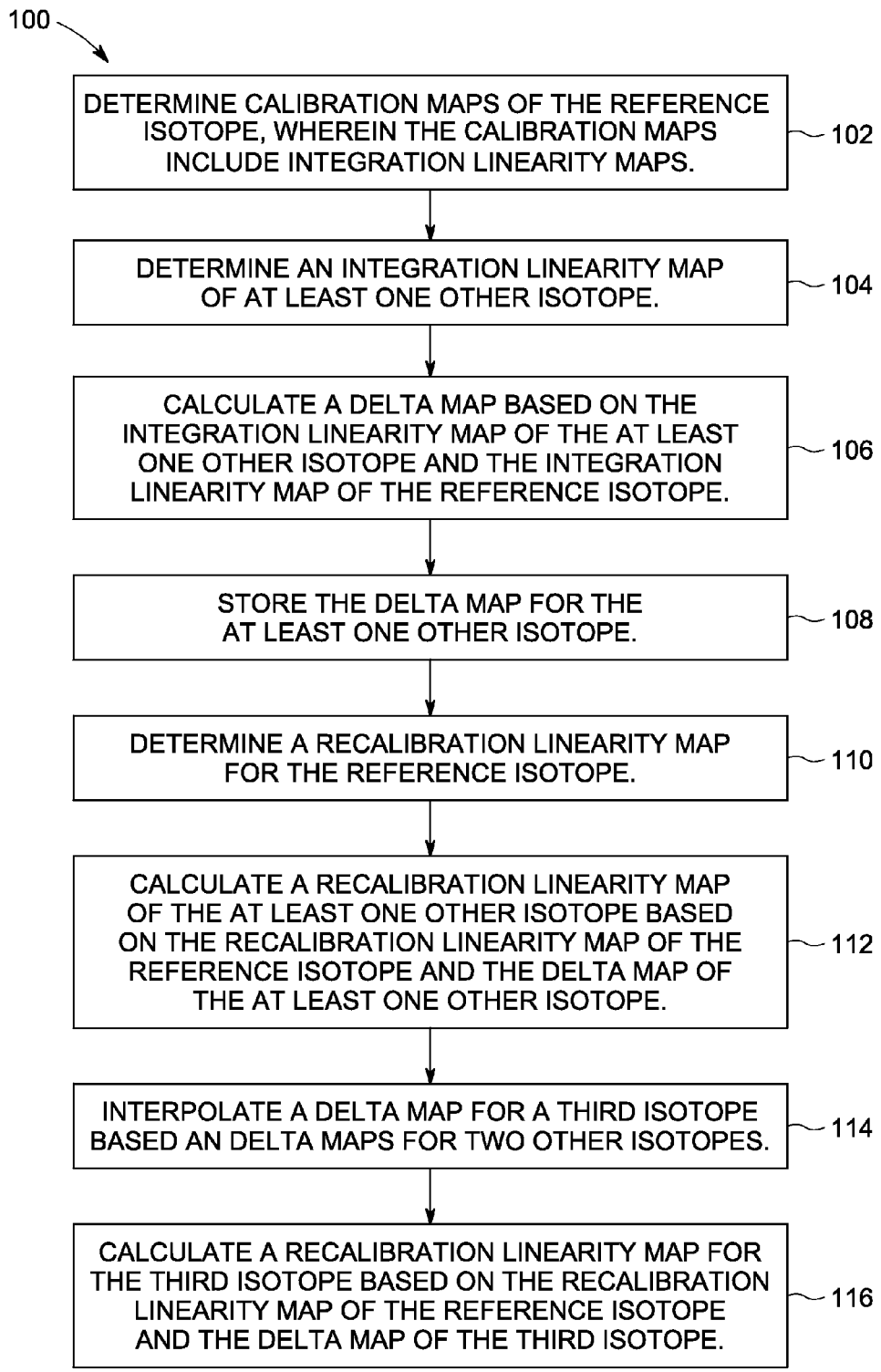
FIG. 1 is a flowchart illustrating a method of generating calibration maps in accordance with various embodiments.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the phrase "reconstructing an image" is not intended to exclude embodiments in which data representing an image is generated, but a viewable image is not. Therefore, as used herein the term "image" broadly refers to both viewable images and data representing a viewable image. However, many embodiments generate, or are configured to generate, at least one viewable image.

Figure 2:
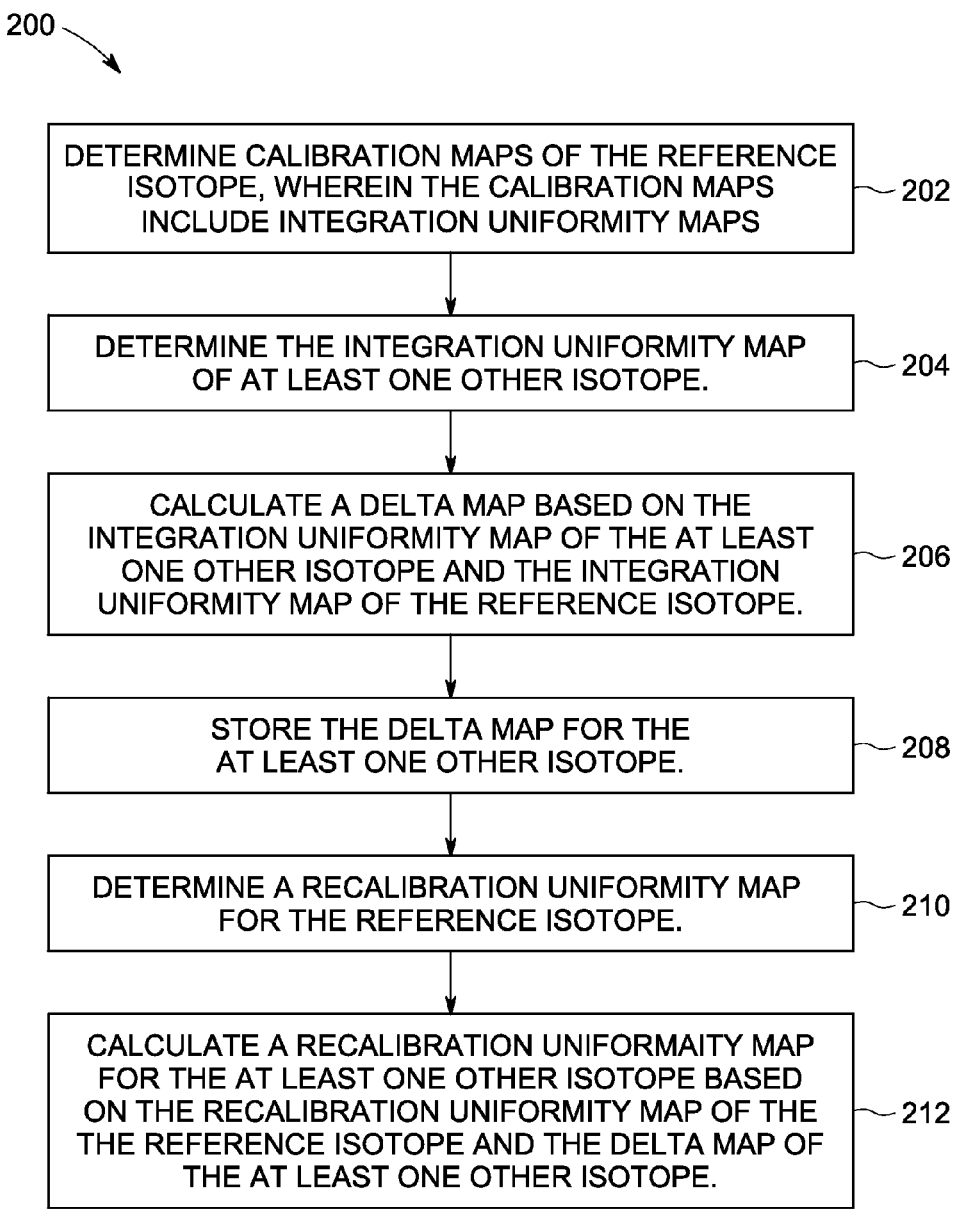
FIG. 2 is a flowchart illustrating another method of generating calibration maps in accordance with various embodiments.
Figure 3:
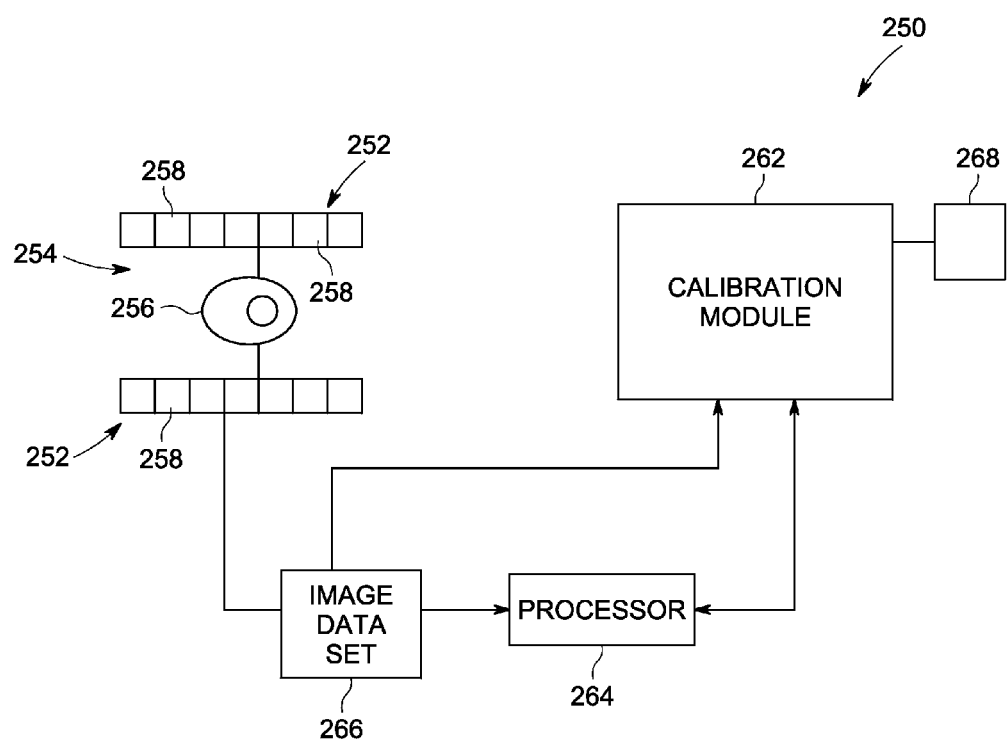
FIG. 3 is a schematic block diagram of an imaging system in which the methods of FIG. 1 and FIG. 2 may be implemented.

Methods 100 and 200, shown in FIGS. 1 and 2, respectively, provide for the generation of calibration maps for calibrating a non-pixelated gamma detector in accordance with various embodiments. The image information used for the calibration methods described herein may be acquired, for example, by an imaging system 250 as shown in FIG. 3. The imaging system 250 includes one or more detectors, such as a pair of detectors 252 having a central opening 254 therethrough. The opening 254 is configured to receive an object therein, such as a patient 256. The detectors 252 are non-pixelated detectors. The non-pixelated detectors 252 may be configured to acquire single photon emission computed tomography (SPECT) image data. The detectors 252 may be formed from sodium iodide (NaI) or other suitable materials. In various embodiments, a plurality of photomultiplier tubes (PMTs) 258 are provided in combination with the detectors 252.

Linearity Correction

The imaging system 250 also includes a calibration module 262 that implements the various embodiments, including the method 100 (shown in FIG. 1) and method 200 (shown in FIG. 2) to generate calibration maps. Specifically, the method 100 shown in FIG. 1 is utilized to generate linearity maps and the method 200 shown in FIG. 2 is utilized to generate uniformity maps. The calibration module 262 may be implemented in connection with or on a processor 264 (e.g., workstation) that is coupled to the imaging system 250. Optionally, the calibration module 262 may be implemented as a module or device that is coupled to or installed in the processor 264. During operation, the output from the detectors 252, which may be one or more image data sets 266, is transmitted to the calibration module 262. The calibration module 262 is configured to generate and/or utilize calibration maps to identify and remove noise related to the detectors 252 and thereafter form a corrected image 268 from acquired image data sets 266. More specifically, in the exemplary embodiment, the calibration module 262 generates one of linearity maps, uniformity maps, and/or energy maps and then uses these maps to form the corrected image 268. The calibration module 262 may be implemented as a set of instructions or an algorithm installed on any computer that is coupled to or configured to receive the image data set 266, for example, a workstation coupled to and controlling the operation of the imaging system 250.

In the following discussion, the term "integration" refers generally to the process of constructing the camera or the detector at the manufacturing facility and the process of initial calibration of said detector. In some cases, after major repair, integration process is repeated in the field. However, in normal operation, only calibration updates are necessary during the product lifetime. It should be noted that considerable time, efforts and expense is spent during the integration and updating processes and it is advantageous to simplify and shorten them. In some cases, for example when some isotopes are not on hand or for saving time, the calibration accuracy (and thus, the image quality) is scarified by not performing some of the calibration steps. It is an object of some of the embodiments of the current invention to provide improved calibration processes that shortens the integration or calibration process without (or with only minimally) reduce the calibration accuracy. Referring specifically to FIG. 1, the method 100 includes determining at 102 an integration linearity map of a reference isotope (also referred to herein as a base isotope) using the calibration module 262. In the exemplary embodiment, the reference isotope is Technetium. However, as will be appreciated by one of ordinary skill in the art, other isotopes may be used as the reference isotope, for example Cobalt or Barium. When reference in made herein to "integration", this generally refers to processes performed during manufacturing, assembly or initial installation of an imaging system.

The linearity map is created using known suitable methods for generating linearity maps and is created for one or more energy peaks for each of the isotopes. Specifically, in some embodiments the linearity map is created by imaging a perforated phantom formed from a flat lead sheet having a two dimensional array of holes positioned adjacent to the detector's sensitive surface, and exposed to a substantially uniform and almost parallel gamma radiation from isotope source (e.g., reference isotope) located at a distance from and central to the surface of the detector. Alternatively, the linearity map may be created by first imaging a phantom having an array of thin parallel slits positioned such that the slits are parallel to one dimension of the detector, and then imaging a phantom having an array of thin parallel slits positioned such that the slits are orthogonal to the direction during the first imaging.

By comparing the acquired image with the known locations of the holes (or slits) in the phantom, a linearity correction map may be created. A linearity correction map allows correction of systematic and incidental distortion related to the detector caused by the general construction and specific variations of the specific detector. The linearity map allows mapping each detected event from its "measured location", as calculated (e.g., by an Anger algorithm, or other algorithm) from the measured PMT signals to a "corrected location" that is the estimated true location where the gamma photon was absorbed on the 2D detector surface. It should be noted that in general, a linearity map is specific to a specific detector geometry when operated at a specific energy window.

One or more images of the linearity phantom are used to create the linearity map, which thereafter is used to compensate for image distortions based on a difference between the location of the measured emission events and the actual location of events. The linearity map may be provided in the form of one or more matrices that are applied to an image to form corrected or compensated images.

If the distortions in an uncorrected image are analyzed, the first and main contribution to the distortion relates to the actual physical construction of the detector. This distortion is caused by, and affected by the parameters such as the location of the PMTs, the thickness of the NaI crystal, the type and sizes of the PMTs, the thickness of the glass window used in the detector, etc. This distortion is common to all detectors of the same type and independent of energy or the specific detector. This first order distortion may be expressed as: D1(x,y).

A secondary distortion relates to photon energy. The root cause for energy dependence of the distortion is that photons at higher energies are likely to penetrate deeper into the detector and light distribution among the PMT is depth dependent. Energy related variation are common to all detectors of same type, and is approximately linear in energy. For example, if a map is created at energy E0 and is used for correcting an image measured at E'=E0+dE, a certain distortion D2(x,y) will be observed in the corrected image. The linearity of the distortion results in D2(x,y)=dE*d2(x,y), where d2(x,y) is a function specific to the detector type.

In accordance with various embodiments, by measuring linearity images from a plurality of detectors of the same type, at least two different energies, the first and second types of distortion may be characterized.

The third type of distortion D3{i}(x,y) is specific to each specific detector "i" and related to components and construction thereof. For example, not all PMTs have the same gain, tolerances in PMTs positions, a specific PMT may have a non-uniform light sensitivity over the PMT face, imperfections in optical index matching grease used for interfacing the PMT, etc. Although the third distortion may depend also on energy, this detector specific energy distortion (D4{I,dE}(x,y)) is of a lower order change and may be neglected.

The distortion of a specific detector "i" at energy E'=E0+dE is approximated as:

Distortion{i,E'=E+dE}(x,y)~D1(x,y)+dE*d2(x,y)+
    D3{i}(x,y)+D4{i,dE}(x,y)~D1(x,y)+dE*d2(x,y)+
    D3{i}(x,y)

where D4{i,dE}(x,y) is neglected.

From this distortion analysis, it is apparent that by subtracting linearity maps created for the same detector "i" at two different energies: F=E0+dE and E0, a vectoral delta map (Delta{i,E'}(x,y)) results, wherein:

Delta{i,E'}(x,y)=Distortion{i,E'=E0+dE}(x,y)-
    Distortion{i,E0}(x,y)=>~D1(x,y)+dE*d2(x,y)+
    D3{i}(x,y)-D1(x,y)+D3{i}(x,y)~dE*d2(x,y)

Thus;

Delta{i,E'}(x,y)=dE*d2(x,y)+"negligible forth order correction"

Figure 10:
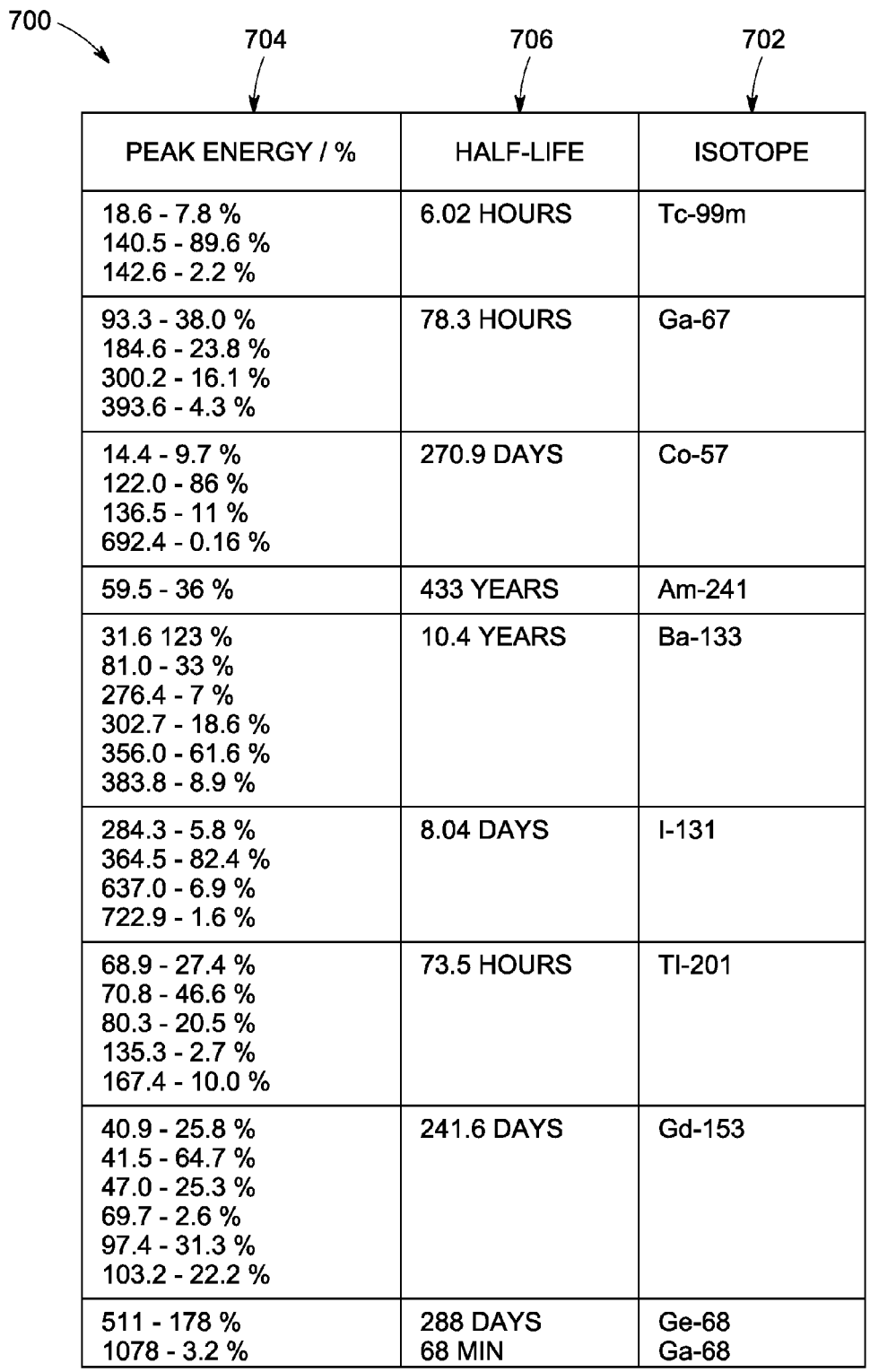
FIG. 10 is a chart illustrating the peak energies for a plurality of exemplary isotopes.

Accordingly, referring back to FIG. 1, an integration linearity map for at least one other energy, for example, an energy for another isotope (Isotope A) is created at 104. At 106, a delta or difference map is then created based on the above-described relationship between the integration linearity maps of the reference isotope and Isotope A. In the exemplary embodiment, the linearity map is created for a specific peak energy of Isotope A. In other embodiments, a linearity map for each peak energy of Isotope A may be created. For example, as illustrated in FIG. 10, Technetium has a single major energy peak at about 140.5 keV, while other isotopes, such as Thallium and Gallium, have more than a single major energy peak.

It should be noted that the initial steps of calculating the delta maps (integration process) typically takes place, for example, at a manufacturing and/or testing site for the detector during an initial calibration process, can be measured once for a prototype or can be calculated by simulation. In the various embodiments, the delta maps are calculated by subtracting the integration linearity map of the reference isotope from the integration linearity map of Isotope A. The difference calculation may be performed based on the following equation:

Del_isotope A=linearity_map_Isotope A-linearity_map_Ref wherein Del_isotope A is the delta map for transforming from one linearity map (corresponding to the reference isotope) to another linearity map (corresponding to Isotope A); linearity_map_Isotope A is the integration linearity map of Isotope A at initial calibration; and linearity_map_Ref is the integration linearity map of the reference isotope at initial calibration.

It should be noted that in the various embodiments the delta maps consist of matrixes containing X and Y coefficients. Accordingly, the subtraction process is performed for each element of the matrixes separately. For example, an X coefficient of the reference isotope linearity map is subtracted from an X coefficient of the Isotope A linearity map and a Y coefficient of the reference isotope linearity map is subtracted from a Y coefficient of the Isotope A linearity map as described in more detail above.

The delta map is then stored at 108 in connection with the imaging system 250, for example, within a memory of the imaging system 250. In other embodiments, the delta maps may be stored in software that is used with the imaging system 250. The delta map may then be used to recalibrate a detector of the imaging system 250 or other imaging systems, such as imaging systems having similar detector geometries. During recalibration, a recalibration linearity map need only be determined for the reference isotope at 110 (and not for other isotopes). Accordingly, and for example, during recalibration in the field, the delta map may be added at step 112 (e.g., in a matrix addition process) to the recalibration linearity map of the reference isotope using the following equation:

Isotope_A_recal_linearity_map=Ref_recal_linearity_map+Del_isotope A wherein Isotope_A_recal_linearity_map is the recalibration linearity map of Isotope A; Ref_recal_linearity_map is a recalibration linearity map of the reference isotope; and Del_isotope is the delta map for transforming the linearity of the reference isotope to the linearity map of Isotope A.

In some embodiments, and as described in more detail herein, an average delta map function (<Delta{E'}(x,y)>) may be computed for several (N) detectors to provide an average delta map for an Isotope A that is usable with any of (N) detectors, with (<Delta{E'}(x,y)) defined as follows:

<Delta{E'}(x,y)>=[Delta{1,E'}(x,y)+
    Delta{2,E'}(x,y)+ ... +
    Delta{N,E'}(x,y)]/N dE*d2(x,y)

wherein the effect of the negligible forth order correction is "averaged out" almost completely. Additionally, the statistical noise present is also decreased.

It should be noted that an "average"<Delta{E'}(x,y)> is related to a specific base energy "E0". Thus, several such functions may be defined starting with different reference energy E0. For example, a camera with a very large energy span may be calibrated at two or more reference energies, each to be used at a different energy range.

Additionally, it should be noted that an "average"<Delta{E'}(x,y)> is related to a specific energy difference "dE". Thus, several such functions may be defined starting with same reference energy E0, but different dE. For example, a camera with a energy span above and below the reference energy E0 may be calibrated using two different Delta {E'}(x,y):

A "NegDelta{E'}(x,y)" computed at negative dE in respect to E0, to be uses for energies below E0; and A "PosDelta{E'}(x,y)" computed at positive dE in respect to E0, to be uses for energies above E0.

It should be noticed that once average <d2 (x,y)> is found from:

$$<d2(x,y)>=<\text{Delta}\{E'=E0+dE\}(x,y)>/dE,$$

calibration at any other energy can be obtain by:

$$<\text{Delta}\{E'=E0+dE'\}(x,y)>=dE'^*<d2(x,y)>$$

Thus, any energy, including never before measured energy, may be corrected.

Calculation of <Delta{E'}(x,y)> is performed, for example at the manufacturing facility using a database of large number of detectors that have been routinely calibrated during manufacturing. Accordingly, by measuring only the base linearity of a new detector "k" at energy E, the distortion (Distortion{k E}(x,y)) of the detector can be constructed, wherein:

$$\text{Distortion}\{k,E0\}(x,y) \sim D1(x,y)+D3\{k\}(x,y).$$

An energy map can then be approximated for this new detector, without measurements for each of a plurality of isotopes or energy levels, with the new Energy E'=E0+dE defined by:

$$\text{Distortion}\{k,E\}(x,y) \sim \text{Distortion}\{k,E0\}(x,y)+ <\text{Delta}\{E'\}(x,y)> \sim D1(x,y)+D3\{k\}(x,y)+ dE^*d2(x,y).$$

As such, when a detector "k" is repaired, for example by replacing a defective PMT or replacing another component, the detector may be treated as new k' detector. Thus, it may be assumed that the primary change is in the term: D3{k}(x,y)=>D3{k'}(x,y).

Thus, the new detector may be re-calibrated by measuring a linearity map for only one energy E0 with:

$$\text{Distortion}\{k',E0\}(x,y)$$

and constructing the linearity maps for all the other energies E' by either:

a. Distortion{k', E'}(x,y)~Distortion{k',E0}(x,y)+ <Delta{E'}(x,y)> or
b. Distortion{k', E'}(x,y)~Distortion{k', E0}(x,y)+ Delta{k,E'}(x,y)

It should be noted that this calibration and re-calibration may be performed for several energies E0 and E'. Generally, in various embodiments, an estimation for energy E' map is performed from a base map measured at energy E0 not much different than E0 (or mathematically: E'~E0). Thus, base maps and delta maps may be created for one or two energy ranges. Therefore, to create a linearity map for a detector "k" at a new energy E"=E0+DE wherein DE is not equal to dE, the map Distortion{k, E"}(x,y) can be approximated by:

$$\text{Distortion}\{k,E''\}(x,y) \sim \text{Distortion}\{k,E0\}(x,y)+ DE^*<\text{Delta}\{F\}(x,y)/dE> = D1(x,y)+D3\{i\}(x,y)+ DE^*d2(x,y).$$

The base maps and corresponding delta maps in various embodiments are selected to be taken at energies of isotopes are easily obtained, for example, Tc, which is generally available at a hospital.

Accordingly, referring back to FIG. 1, if a delta map is known for two isotopes (a reference Isotope A and Isotope B) and a delta map is required or desired for another isotope (Isotope C) other than Isotope A or B, a delta map for transforming a linearity map of Isotope C may be interpolated from the delta maps related to Isotopes A and B, at 114. Specifically, referring to the chart 700 of FIG. 10, if Isotope C is Thallium (Tl), as shown at 702, having a peak energy level of 70.8 keV, as shown at 706, that falls between the peak energy levels of Isotope A (Am at 59.5 keV) and the reference isotope (Tc at 140.5 keV), the delta map related to Isotope C is created using the following equation:

$$\text{Del\_Isotope\_}C=\text{Ref\_map}(x,y)+F(E-E\text{Ref},\text{del\_isotope\_}A(x,y),\text{del\_isotope\_}B(x,y))$$

wherein Del_Isotope_C is the delta map for transforming the linearity map of Isotope C at the specific peak energy of 70.8 keV (see FIG. 10); del_isotope_A and del_isotope_B are the delta maps for transforming the two Isotopes A and B, Ref_map(x,y) is a linearity map of the reference isotope; and F is an interpolation function to interpolate the known delta maps del_isotope_A and del_isotope_B at the specific energies of Isotope A (59.5 keV) and Isotope B (356.0 keV) (see FIG. 10).

Based on a linear relationship between the specific peak energies of Isotopes A, B and C, a delta map for transforming the linearity map of Isotope C may be linearly interpolated from Isotopes A and B. In other embodiments, the interpolation may be cubic or quadratic. Accordingly, a delta map for transforming the linearity map of only two isotopes, Isotopes A and B, need be calculated during the initial calibration or for a prototype or using simulation and only these delta maps are stored in the imaging system. At 116, the linearity map for Isotope C is then calculated on the fly or at the recalibration site by adding the delta map for the Isotope C to the new linearity map of the reference isotope.

As another example, base linearity maps can be measured and averaged at the factory for Tc99m (140 keV), Am241 (59.5 keV), and Ba133 (356 keV peak) (see FIG. 10). Two delta maps are then created:

$$<\text{Delta}(Tc=>Am)>=<\text{Distortion}(59.5)- \text{Distortion}(140)>; \text{ and}$$

$$<\text{Delta}(Tc=>Ba)>=<\text{Distortion}(356)- \text{Distortion}(140)>$$

During recalibration, a new map is created for a new detector "k" for Ga67, having peaks at 93.3, 184.6 and 300.2 (see FIG. 10). Each energy peak is associated with a separate map. First, a map Distortion{k, 140} is measured. Then:

$$\text{Distortion}\{k,93.3\}=\text{Distortion}\{k,140\}+<\text{Delta}(Tc=>Am)>^*(140-93.3)/(140-59.5);$$

$$\text{Distortion}\{k,184.6\}=\text{Distortion}\{k,140\}+<\text{Delta}(Tc=>Ba)>^*(140-184.6)/(140-356); \text{ and}$$

$$\text{Distortion}\{k,300.2\}=\text{Distortion}\{k,140\}+<\text{Delta}(Tc=>Ba)>^*(140-300.2)/(140-356)$$

In other embodiments, a delta map may be calculated for each of a plurality of Isotopes A1-AN and each map stored on the system. Accordingly, rather than using interpolation, the system may be recalibrated for each of these isotopes at 112 using each map.

In a preferred embodiment, linearity correction is performed for each event depending on its energy Em. According to this embodiment, for each event to be processes, energy difference from reference energy E0 is computed as: dEm=Em−E0. The event location distortion is computed as:

$$\text{Distortion}\{E\}(x,y)=\text{Distortion}\{E0\}(x,y)+ dEm^*<d2(x,y)>$$

In this case, <d2(x,y)>, (and optionally E0) may be selected by the range in which Em falls.

In some embodiments, <d2(x,y)> itself may be interpolated as a function of energy. In these embodiments, several measurements for <d2(x,y)> are performed at different energy differences from the reference energy E0. A parabolic approximation (or other approximation) may be used as known in the art to fit the distortion and express it for example as:

$$\text{Distortion}\{E\}(x,y) = \text{Distortion}\{E0\}(x,y) + dEm*<d2'(x,y)> + dEm^2*<d2''(x,y)>$$

Uniformity Correction

Referring to method 200 (shown in FIG. 2), delta maps may be calculated to generate a uniformity or sensitivity map of the detector based on an integration uniformity map of a reference isotope determined at 202. An integration uniformity map for at least one other Isotope (Isotope A) is also calculated at 204. Uniformity maps are generally related to a specific detector, specific collimator, and specific energy window.

The sensitivity map S{collimator=C, detector=D, energy=E}(x,y) is assumed to be composed of:

$$S\{C,D,E\}(x,y) = C\{C\}(x,y) * s\{D,E\}(x,y)$$

wherein $C\{C\}(x,y)$ is the collimator sensitivity function (which is energy dependent to a small degree), and $s\{D,E\}(x,y)$ is the intrinsic sensitivity function of the crystal, which is energy dependent.

Because the various embodiments relate to a specific detector, the index "D" is dropped such that:

$$S\{C,E\}(x,y) = C\{C\}(x,y) * s\{E\}(x,y)$$

Moreover, $s\{E\}(x,y)$ is further expressed as $s\{E\}(x,y) = s\{E0\}(x,y) * \text{delta}\{E\}(x,y)$ wherein $s\{E0\}(x,y)$ is the intrinsic detector sensitivity at a reference energy E0 and delta$\{E\}(x,y)$ represent the energy depending changes. While $s\{E0\}(x,y)$ may change in time due to PMT aging, etc, it is assumed that delta$\{E\}(x,y)$ represent a weak (−1) systematic function that does not change in time. Thus:

$$S\{Cx,Ex\}(x,y) = C\{Cx\}(x,y) * s\{E0\}(x,y) * \text{delta}\{Ex\}(x,y)$$

During initial calibration or integration, $S\{C,E\}(x,y)$ may be measured either directly or indirectly. For example, the measurement may be performed using a flood source of energy "E" on top of the collimator "C". However, such measurements may be difficult because flood sources are not available for all isotopes and the process is time consuming since the collimator allows only a small fraction (~1:10,000, depending on collimator type) of the photons to penetrate. Thus, it is possible to measure $S\{C,E\}(x,y)$ directly only for a limited number of energies, and at long exposure times. However, direct measurement correctly accounts for collimator septa penetration inhomogeneity.

Alternatively, $S\{C,E\}(x,y)$ may be measured indirectly by measuring directly, with collimator C0 in place, $S\{C0, E0\}(x,y)$ using a flood source at E=E0 and collimator C0, removing the collimator and measuring $s\{E0\}$ using a point source having E=E0 placed far from the detector (without collimator), and calculating the collimator response for collimator C0: $C\{C0\}(x,y) = S\{C0,E0\}(x,y)/s\{E0\}(x,y)$.

At 204 of FIG. 2, the detector response $s\{E1\}$ is then measured for another isotope having energy E=E1 using a point source having energy E=E1 placed far from the detector (without collimator). Then, the sensitivity map for collimator C0 is calculated at energy E1: $S\{C0,E1\}(x,y) = C\{C0\}(x,y) * s\{E1\}(x,y)$. These steps are repeated for obtaining $S\{C0,E2\}(x,y)$ using a point source of energy E2, etc. The process is then repeated for all the collimators that are supplied with or installed on the camera: C0, C1, C2, etc. The following maps are then provided with the camera at 208:

$$s\{E0\}(x,y),$$

$$S\{C0,E0\}(x,y), S\{C0,E1\}(x,y), S\{C0,E2\}(x,y) \ldots$$

$$S\{C1,E0\}(x,y), S\{C1,E1\}(x,y), S\{C1,E2\}(x,y) \ldots$$

$$S\{C2,E0\}(x,y), S\{C2,E1\}(x,y), S\{C2,E2\}(x,y) \ldots, \text{etc.}$$

It should be noted that some maps S{C,E'}(x,y) may be obtained using direct measurement and some obtained using indirect measurement. Accordingly, whenever a map S{C,E'}(x,y) needs to be re-created, the following may be performed. The collimator is removed and new intrinsic sensitivity $s'\{E0\}(x,y)$ is measured separately for each detector head at 210, using a point source at energy E0. All the new sensitivity maps S'{Cx,Ex}(x,y) are re-calculated according to:

$$S'\{Cx,Ex\}(x,y) = S\{Cx,Ex\}(x,y) * s'\{E0\}(x,y)/s\{E0\}(x,y)$$

As such, the recalibration sensitivity/uniformity map is created at 212. The new sensitivity map S'{Cx,Ex}(x,y) could be expressed as:

$$S'\{Cx,Ex\}(x,y) = C\{Cx\}(x,y) * s'\{Ex\}(x,y) = C\{Cx\}(x,y) * s'\{E0\}(x,y) * \text{delta}\{Ex\}(x,y),$$

because the collimator $C\{Cx\}(x,y)$ and the detector systematic energy deviation delta$\{Ex\}(x,y)$ are slightly or not affected by aging or repair of the detector. However:

$$S\{Cx,Ex\}(x,y) * s'\{E0\}(x,y)/s\{E0\}(x,y) =$$

$$[C\{Cx\}(x,y) * s\{E0\}(x,y) * \text{delta}\{Ex\}(x,y)] * s'\{E0\}(x,y)/s\{E0\}(x,y) =$$

$$C\{Cx\}(x,y) * s'\{E0\}(x,y) * \text{delta}\{Ex\}(x,y) = S'\{Cx,Ex\}(x,y)$$

These sensitivity maps may also be converted to delta maps at 206 using the following equation:

Del_isotope = Isotope_A_integration/Ref integration

Isotope_A_recal = Ref_recal * Del_isotope wherein Del_isotope is the delta map for Isotope A; Isotope_A_integration is the integration uniformity map of Isotope A; Ref integration is the integration uniformity map of the reference isotope; Isotope_A_recal is the recalibration uniformity map of Isotope A; and Ref_recal is the recalibration uniformity map of the reference isotope. The delta maps are stored in the system at 208 and used to create new sensitivity maps at 212.

In other embodiments, the delta maps of some isotopes may be interpolated from the delta maps of other isotopes. It should be noted that the uniformity map is created on a pixel by pixel basis. In the exemplary embodiments, a uniformity map of each Isotope A1-AN is calculated based on the single uniformity map of the reference isotope and the data related to each isotope collected during initial calibration.

Figure 4:
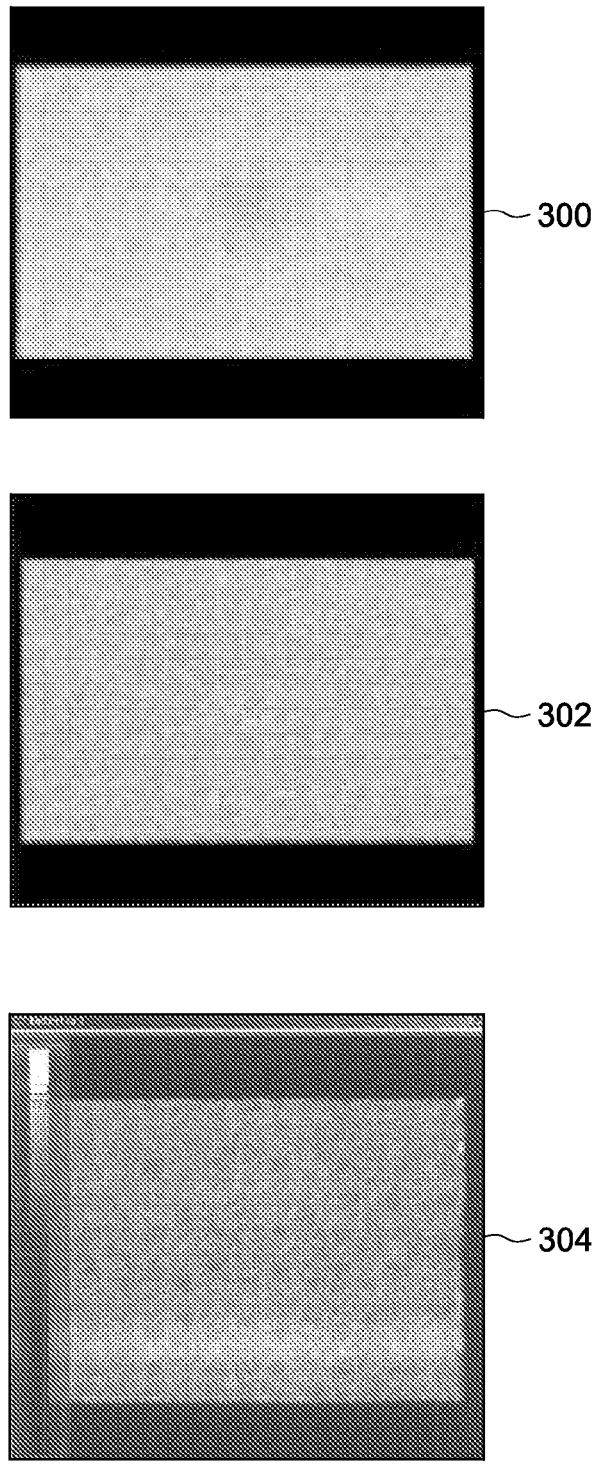
FIG. 4 are images illustrating the calibration results of the method of FIG. 1.

FIG. 4 illustrates images generated by an imaging system prior to and subsequent to calibration. The images include an isotope image 300 acquired with standard linearity calibration and an isotope image 302 acquired using the linearity calibration in accordance with the various embodiments. In addition, an image 304 acquired using a Tc linearity map without adding a delta map is also shown. In FIG. 4 the images presented are generated without uniformity correction. As can be seen in FIG. 4, the image 302 acquired with the methods of the various embodiments provide at least the same image quality as the standard method of applying a linearity map (as seen in image 300). However, the methods described herein require less time and costs associated with recalibrating the imaging system by recalibrating the imaging system using only the reference isotope and the delta maps. Quantitative measurements of uniformity, linearity and resolution of the standard and the herein described linearity acquisitions result in similar values.

Figure 5:
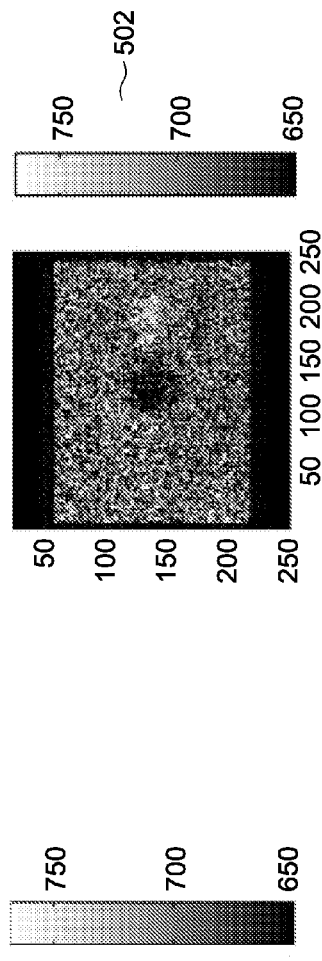
FIG. 5 is an exemplary image acquired after standard calibration.
Figure 6:
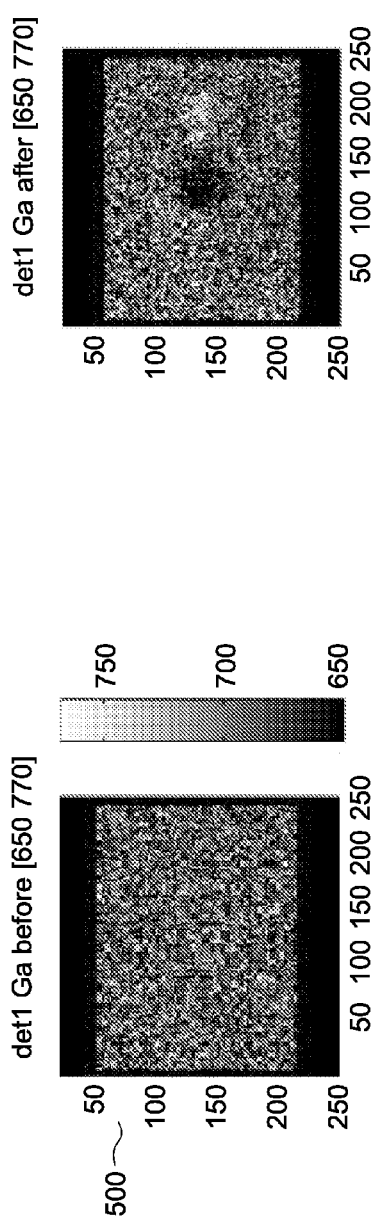
FIG. 6 is an exemplary image acquired after opto-mechanical changes.
Figure 7:
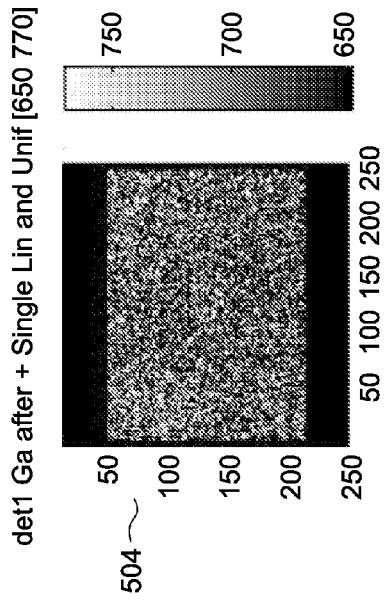
FIG. 7 is an exemplary image acquired after applying linearity and uniformity calibration procedures of the various embodiments.

FIGS. 5-7 illustrate results from using the described methods of creating uniformity maps. The imaging system was shut off for one week and then used under opto-mechanical instabilities (24 hours of rotations) and optical instabilities (new grease). In the detectors, two PMTs were replaced. FIGS. 5-7 illustrate the results obtained for a Gallium (Ga) isotope. Specifically, three images of Ga measured at three stages are shown: reference image 500 after standard calibration, image 502 after opto-mechanical changes, and image 504 after applying the methods described herein. As can be seen in image 504 in FIG. 7, the images acquired with the described method offer the same image resolution as the standard method of recalibrating the detector, as seen in FIG. 5. However, the methods described herein require recalibrating the imaging system using only the reference isotope.

Figure 8:
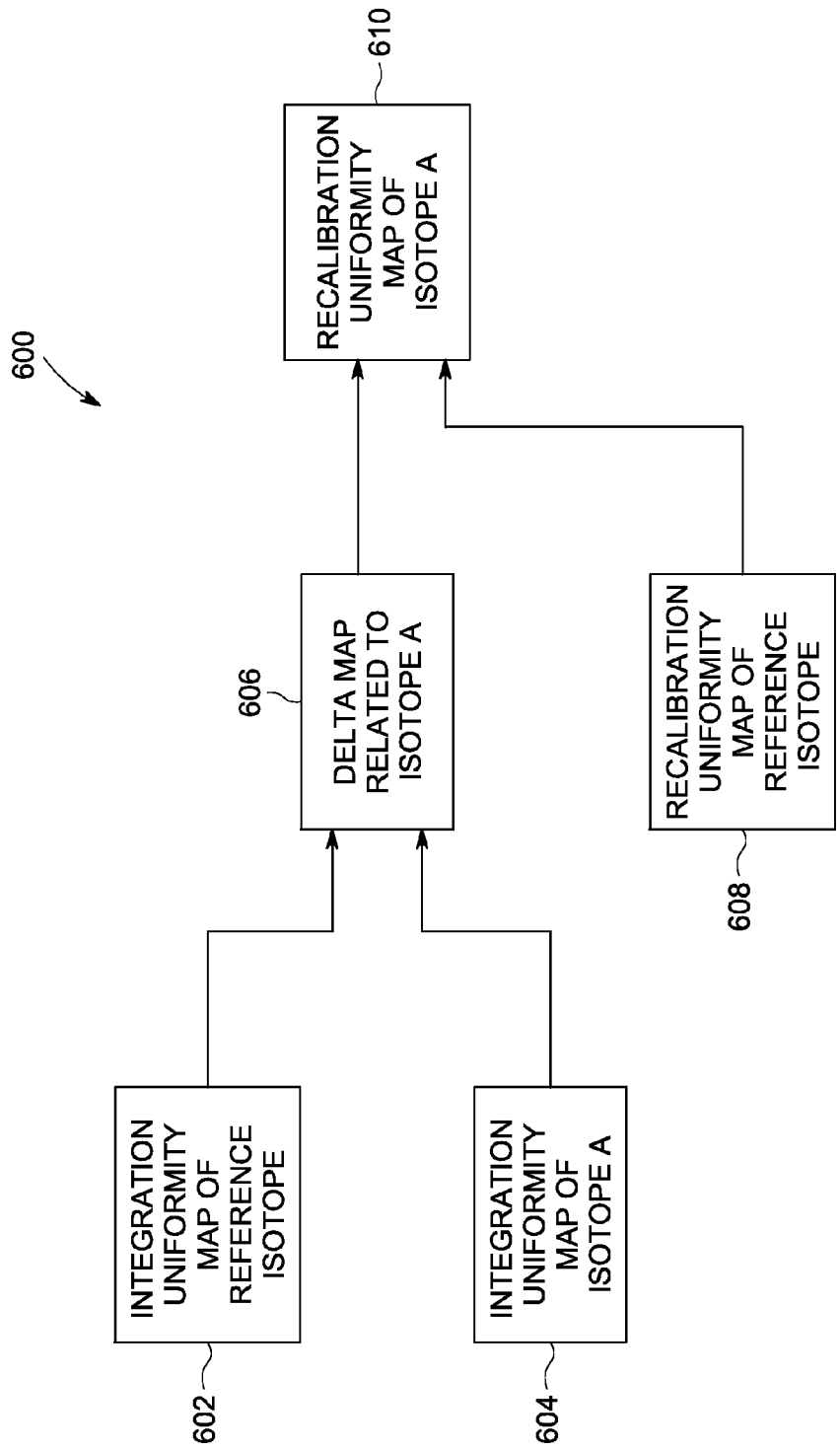
FIG. 8 is a block diagram illustrating a method of generating calibration maps in accordance with the various embodiments.

Thus different types of calibration maps may be generated in accordance with various embodiments. FIG. 8 illustrates a block diagram 600 for generating calibration maps in accordance with the various embodiments. Specifically, for generating uniformity maps, during an initial calibration, an integration calibration map is created for both a reference (base) isotope 602 and an Isotope A 604. A delta map related to Isotope A 606 is then created based on a relationship between Isotope A and the reference isotope, for example, as described in more detail in connection with methods 100 and 200. During new calibration (for a new isotope) or recalibration (to compensate for detector drift due to imaging or repair), a new or recalibration map of the reference isotope 608 is generated. The relationship between the recalibration map 608 and the delta map 606 is then utilized to form a new or recalibration map of Isotope A 610.

According to a preferred embodiment of the invention, collimator uniformity $C\{Cx\}(x,y)$ is ignored for some or all collimators for some or all energies. In this case it is assume that $C\{Cx\}(x,y)=1.00$ This assumption is valid for modern collimators. In this embodiment, integration process includes only measuring naked detectors. Collimators are supplied directly to the hospital and tested there (preferably with a Cobalt flood source). A collimator is rejected and replaced if it does not perform to specifications. According to this embodiment of the current invention, intrinsic (without collimator) uniformity maps are measured at integration at a plurality of energies E0, E1, E2 . . . En. The created maps: $Si\{E0\}(x,y)$, $Si\{E1\}(x,y)$, $Si\{E2\}(x,y)$ . . . are supplied with the detector.

If the detector needs calibration, only the reference energy E0 is re-measured and map $Si'\{E0\}(x,y)$ is creates. All other maps for all energies Ek are updated to $Si'$ by calculating:

$$Si'\{Ek\}(x,y)=Si\{Ek\}(x,y)*Si'\{E0\}(x,y)/Si\{E0\}(x,y)$$

Figure 9:
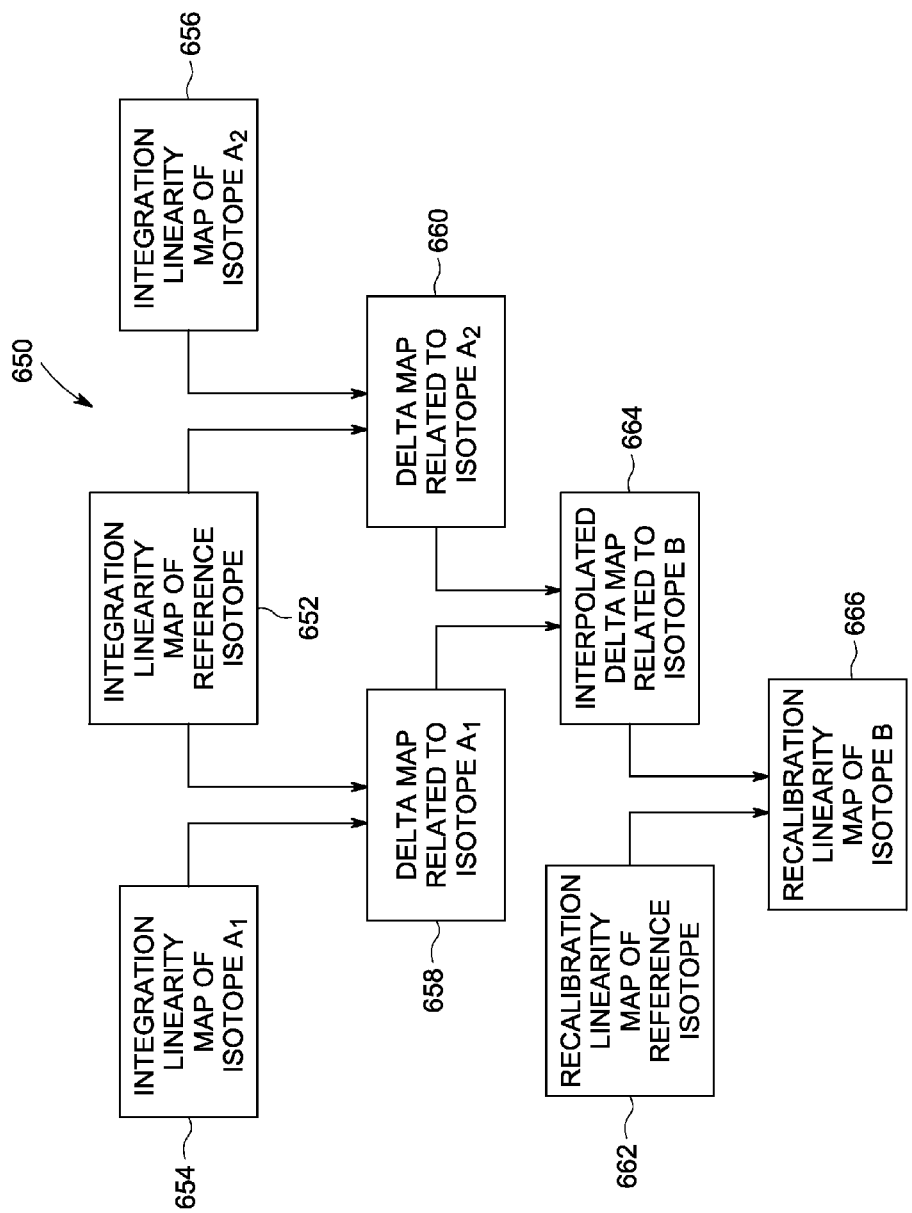
FIG. 9 is another block diagram illustrating a method of generating calibration maps in accordance with other various embodiments.

FIG. 9 illustrates another block diagram 650 for generating calibration maps in accordance with the various embodiments. Specifically, for generating linearity maps, during an initial calibration, an integration calibration map is generated for a reference (base) isotope 652, an Isotope A1 654, and an Isotope A2 656. A delta map related to Isotope A1 658 is then created based on a relationship between Isotope A1 and the reference isotope, for example, as described in more detail in connection with method 100, and a delta map related to Isotope A2 660 is created based on a relationship between Isotope A2 and the reference isotope. A delta map 662 related to another isotope, Isotope B, is then interpolated based on delta maps 658 and 660. During recalibration, a new or recalibration map of the reference isotope 664 is generated. A relationship between the recalibration map 664 and the delta map of Isotope B 662 is then utilized to form a new or recalibration map of Isotope B 666. The interpolated delta maps may be generated dynamically (e.g., on the fly), for example, based on a presently detected energy level and not using stored interpolated delta maps.

FIG. 10 is a chart illustrating the specific peak energies for a plurality of exemplary isotopes. Specifically, column 702 provides a list of isotopes. Of these isotopes, Technetium, Gallium, Iodine and Thallium are commonly used for patient studies. Cobalt, Americium, Barium, and Gadolinium are typically used for calibration of the detector. Column 704 lists the half-life of each isotope and column 706 provides the peak energies of each isotope, showing major and minor peak energies.

At least one technical effect of the various embodiments is enabling a reduced recalibration time for non-pixelated gamma detectors. Specifically, during initial calibration, delta maps are created that represent a relationship between Isotopes A1-AN and a reference isotope. Accordingly, during recalibration, a new calibration map need only be created for the reference isotope. Based on this new map and the delta maps, new calibration maps are calculated for Isotopes A1-AN without having to recalibrate the system using each isotope. Thus, a calibration map for one isotope may be transformed to form a calibration map for another isotope using a delta map. In the exemplary embodiments, the calibration maps may be either linearity and/or uniformity maps.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for providing a calibration map for a non-pixelated gamma detector, said method comprising:
   determining a calibration map for a reference isotope for a non-pixelated gamma detector; and
   creating a calibration map for another isotope by applying to the calibration map of the reference isotope, a delta map corresponding to the other isotope, wherein the delta map is based on a relationship between the reference isotope and the other isotope.

2. A method in accordance with claim 1, wherein a plurality of delta maps are stored in a system coupled to the non-pixelated gamma detector, each of the plurality of delta maps related to one of a plurality of isotopes or energy peaks.

3. A method in accordance with claim 1, wherein the delta map corresponds to non-pixelated gamma detectors having a same detector geometry.

4. A method in accordance with claim 1, wherein a delta map of first and second isotopes are stored in a system coupled to the detector, said method further comprising interpolating the delta maps of the first and second isotopes stored in the system to generate the delta map of a third isotope.

5. A method in accordance with claim 4, wherein the delta map of the third isotope is interpolated at a specific peak energy.

6. A method in accordance with claim 1, wherein the calibration map is a linearity map, said creating a calibration map for another isotope further comprises adding the delta map to the calibration map of the reference isotope.

7. A method in accordance with claim 6, wherein the delta map is determined by subtracting a calibration map of the reference isotope from a calibration map of the other isotope.

8. A method in accordance with claim 1, wherein creating a calibration map for another isotope further comprises creating the calibration map per detector pixel.

9. A method in accordance with claim 1, wherein the reference isotope is Technetium.

10. A method in accordance with claim 1, wherein the calibration map is a uniformity map, said applying a delta map to the calibration map of the reference isotope further comprises multiplying the calibration map of the reference isotope by the delta map of the other isotope.

11. A method in accordance with claim 10, wherein the delta map is determined by dividing a calibration map of the other isotope by the calibration map of the reference isotope.

12. A calibration module for providing a calibration map for a non-pixelated gamma detector, wherein said calibration module is programmed with instructions configured to:
    determine a calibration map for a reference isotope for a non-pixelated gamma detector; and
    create a calibration map for another isotope by applying to the calibration map of the reference isotope, a delta map corresponding to the other isotope, wherein the delta map is based on a relationship between the reference isotope and the other isotope.

13. A calibration module in accordance with claim 12, wherein the calibration map is a linearity map, said calibration module programmed with instructions further configured to create a calibration map for another isotope by adding the delta map to the calibration map of the reference isotope.

14. A calibration module in accordance with claim 13, wherein said calibration module is further programmed with instructions configured to determine the delta map by subtracting a calibration map of the reference isotope from a calibration map of the other isotope.

15. A calibration module in accordance with claim 12, wherein the calibration map is a uniformity map, said calibration module further programmed with instructions configured to apply a delta map to the calibration map of the reference isotope by multiplying the calibration map of the reference isotope by the delta map of the other isotope.

16. A calibration module in accordance with claim 15, wherein said calibration module is further programmed with instructions configured to determine the delta map by dividing a calibration map of the reference isotope by a calibration map of the other isotope.

* * * * *